(12) United States Patent
Fuhr et al.

(10) Patent No.: US 8,229,112 B2
(45) Date of Patent: Jul. 24, 2012

(54) DECIPHERABLE SEARCHABLE ENCRYPTION METHOD, SYSTEM FOR SUCH AN ENCRYPTION

(75) Inventors: Thomas Fuhr, Paris (FR); Pascal Paillier, Paris (FR)

(73) Assignee: Gemalto SA, Meudon (FR)

( * ) Notice: Subject to any disclaimer, the term of this patent is extended or adjusted under 35 U.S.C. 154(b) by 999 days.

(21) Appl. No.: 12/281,254

(22) PCT Filed: Mar. 8, 2007

(86) PCT No.: PCT/EP2007/052196
§ 371 (c)(1),
(2), (4) Date: Aug. 29, 2008

(87) PCT Pub. No.: WO2007/104705
PCT Pub. Date: Sep. 20, 2007

(65) Prior Publication Data
US 2009/0010436 A1    Jan. 8, 2009

(30) Foreign Application Priority Data

Mar. 15, 2006  (FR) ..................................... 06 50869

(51) Int. Cl.
*H04L 9/00* (2006.01)
(52) U.S. Cl. ........................... 380/30; 713/193; 380/255
(58) Field of Classification Search .................. None
See application file for complete search history.

(56) References Cited

U.S. PATENT DOCUMENTS

| 7,930,756 | B1 * | 4/2011 | Crocker et al. | 726/27 |
| 2004/0165726 | A1 * | 8/2004 | Yamamichi et al. | 380/277 |
| 2004/0179684 | A1 * | 9/2004 | Appenzeller et al. | 380/44 |
| 2005/0022102 | A1 * | 1/2005 | Gentry | 715/500 |
| 2007/0005594 | A1 * | 1/2007 | Pinkas et al. | 707/6 |
| 2007/0199071 | A1 * | 8/2007 | Callas | 726/26 |
| 2010/0020977 | A1 * | 1/2010 | Furukawa | 380/278 |

OTHER PUBLICATIONS

Form PCT/ISA/210 (International Search Report) dated Jul. 6, 2007.
Form PCT/ISA/237 (Written Opinion of the International Searching Authority) dated Jul. 6, 2007.
Dan Boneh et al., "Public Key Encryption With Keyword Search", Eurocrypt 2004, 2004, pp. 506-522, XP-019005037 (cited in the International Search Report, Written Opinion of the International Searching Authority and on p. 1 of the specification).
Philippe Golle et al., "Secure Conjunctive Keyword Search Over Encrypted Data", ACNS 2004, 2004, pp. 31-45, XP-019008011 (cited in the International Search Report and Written Opinion of the International Searching Authority).
Michel Abdalla et al., "Searchable Encryption Revisited: Consistency Properties, Relation to Anonymous IBE, and Extensions", Crypto 2005, 2005, pp. 205-222 (cited in the International Search Report and Written Opinion of the International Searching Authority).

* cited by examiner

*Primary Examiner* — Gilberto Barron, Jr.
*Assistant Examiner* — Shaun Gregory
(74) *Attorney, Agent, or Firm* — Buchanan Ingersoll & Rooney PC

(57) ABSTRACT

A method for encrypting/decrypting a message includes the initial step of generating keys by the sub-steps of generating a public key; generating a decryption key; and generating a derivation key. For a first entity, the message is encrypted using the public key and a cipher. For a second entity, the cipher is decrypted to find the message. A trapdoor associated with said message is generated. The trapdoor corresponds to a derivative of the derivation key specific to the message. A test cipher is tested, using the trapdoor associated with the message, to determine if the test cipher is an encryption of the message using the public key.

14 Claims, 2 Drawing Sheets

DECIPHERABLE SEARCHABLE ENCRYPTION METHOD, SYSTEM FOR SUCH AN ENCRYPTION

The present invention concerns the field of cryptography.

More particularly, it concerns the field of encryption methods enabling the search of encrypted keywords.

Such encryption methods enabling the search of encrypted keywords are known in prior art, in particular the publication by Boneh, Di Crescenzo, Ostrovski and Persiano "Public key encryption with keyword search" EUROCRYPT 2004, Volume 3027 in "Lecture notes in Computer science", pages 506-522.

In such a method known as PEKS for "Public-key Encryption with Keyword Search" method, an entity A provides a gateway, a search trapdoor Tm calculated from the private key thereof, and associated to the keyword m. When an entity B wishes to send a message to the entity A via a symmetrical encryption method, it encrypts a keyword m' with the aid of the public key of the entity A, pk, such as to obtain a cipher C, which is sent to the gateway. The gateway therefore applies a test TEST (Tm, C) using the search trapdoor Tm to determine if the cipher C corresponds to an encryption of the keyword m by the public key pk or not. Such that, the gateway can determine if the cipher C corresponds or not to an encryption of the keyword m, but without having access to said keyword, or to the keyword m' encrypted in C.

Said type of encryption with the possibility of keyword search in the ciphers is used in particular in the field of data transmission. The test TEST (Tm, C) is in this case, discriminating so that the gateway routes a message towards such or such station of the entity A, for example fixed station, portable laptop, mobile telephone, according to the keyword associated to the trapdoor Tm.

In such methods, it is not desired that the gateway can decrypt the cipher C received in order to carry out the routing of messages. No possibility of decryption is therefore envisaged in the encryption methods enabling a search by actual keyword.

However, it may be advantageous to enable a searchable decryption of the ciphers received. For example, in the case of a subscriber of a telephone operator who regularly receives a report of the communications passed encrypted by the operator with the public key of the subscriber, the report is a list of telephone numbers encrypted one after the other with the public key of the subscriber. The subscriber is therefore the only person able to decrypt the report with the aid of the private decryption key thereof, and the encrypted report can therefore be transmitted to the subscriber over a non-confidential communication channel such as the Internet. However, in this case of conventional decryptable encryption, the decryption key of the subscriber decrypts necessarily all of the encrypted information. Now, it is possible that a third party, for example a judge or a police authority wants to have access to said encrypted information. With the encryption methods from prior art, it is not possible for such an authority to have access to a specific number without decrypting all of the numbers, which may impair the confidentiality requirement of the communications.

The present invention intends in particular to overcome said disadvantage of prior art.

Moreover, in a decryptable asymmetrical encryption method, it is advisable to generate a public key for encrypting the message, and a private key associated to the public key for decrypting the message. Thus, from a cipher C, encrypted from a public key pk and a pre-determined keyword m, it is possible to find m, with the aid of the private key sk associated to the public key pk. However, it is advisable to note that said decryption does not enable a search as in the search mechanisms such as previously described in prior art.

Indeed, in such mechanisms, the entity carrying out the search does not know the keyword m clearly. Thus, even when a decryption key is provided, it is therefore not possible to carry out a search consisting of decrypting the cipher C into a word m' and comparing said word m' with the predetermined words m, since the entity carrying out the search does not have the words m.

Thus, the encryption/decryption methods known do not enable keyword searches to be carried out.

The present invention also aims to overcome said disadvantage.

A first aim of the present invention is therefore to provide an encryption method which makes it possible to carry out at the same time searches on keywords and a decryption of the keywords.

Said aim is achieved by the present invention which concerns according to a first aspect a method for encrypting/decrypting a message comprising steps consisting of:
  generating a plurality of keys comprising sub-steps consisting of:
    generating a public key;
    generating a decryption key associated to said public key;
    generating a derivation key associated to said public key;
  for a first entity, encrypting said message with the aid of said public key into a cipher;
  for a second entity, decrypting said cipher to find said message;
  generating a trapdoor associated to said message, said trapdoor corresponding to a derivative of said derivation key belonging to said message;
  for a test cipher, testing, with the aid of said trapdoor associated to said message (m), if said test cipher is an encryption of said message with the aid of said public key.

With the aid of the abovementioned method, the decryption key enables decryption of the encrypted message to be carried out. Moreover, the trapdoor defined with the aid of the derivative of a derivation key enables search tests to be carried out on a test cipher.

Thus, in the abovementioned example of a list of telephone numbers, since the derivation key enabling search trapdoors to be generated is different from the decryption key, the method according to the invention enables the search trapdoors associated to certain specific telephone numbers to be calculated. Such that, if said derivation key is detained by a judge, the latter may emit search trapdoors associated to the telephone numbers of people sought by the police. Said search trapdoors can then be used to detect the presence in the encrypted report of said numbers, whilst preserving the confidentiality of innocent numbers.

The invention also concerns a method for encrypting a message, comprising steps for:
  generating keys comprising sub-steps consisting of:
    generating a public key;
    generating a decryption key associated to said public key;
    generating a derivation key associated to said public key;
  wherein, said public key comprises a first sub-key and a second sub-key, said first sub-key being a public key for encapsulating a first key encapsulation mechanism;
  wherein said decryption key is the private key associated to said first sub-key, said second sub-key is an identity-based public key of a second identity-based key encapsulation mechanism,
said derivation key is the private key associated to said second sub-key, said method comprising steps consisting of:
  applying said first key encapsulation mechanism;
  applying said second identity-based key encapsulation mechanism, the identity parameter of said second identity-based key encapsulation mechanism being said message.

Key encapsulation mechanisms (or KEM) are known as such. They comprise in particular a key generation mechanism, which takes as input a security parameter and which generates a public key and a private key, a key encapsulation mechanism which calculates a random key and encapsulates same in a cipher by using the public key and a random number, and a decapsulation mechanism which takes as input a cipher c, the previously generated public key, the previously generated private key, and which returns the random key encapsulated in the cipher.

Identity-based key encapsulation mechanisms (or ID-KEM) are also known as such. They comprise in particular a key generation mechanism which takes as input a security parameter and generates a public key and a key derivation master secret key which takes as input the public parameters of the system, the master derivation key and an identity, which calculates a secret key associated to the identity, a probabilistic key encapsulation mechanism which uses the public parameters of the system and an identity to generate a random key encapsulated in a cipher, and a key decapsulation mechanism which takes as input a cipher and the secret key associated to the identity and returns the random key encapsulated in the cipher.

Thus, in the abovementioned encryption method, the keys generated enabling both the decryption and the search are therefore based on the keys generated by said two mechanisms.

According to one specific embodiment, said above-mentioned encryption method comprises steps consisting of:
  defining a first processing block implementing said key encapsulation mechanism;
  defining a second processing block implementing said second identity-based key encapsulation mechanism;
  defining a third processing block;
  defining a fourth processing block;
  providing as input of said first processing block, a first input parameter;
  generating, as output of said first processing block, a first output corresponding to a first symmetrical session key, and a second output corresponding to a first key cipher of said first session key with the aid of said first sub-key;
  providing said first session key as input of said third processing block;
  providing said message as input of said third block;
  generating a second message cipher with the aid of said first symmetrical session key and of said message;
  providing said first session key as input of said second processing block;
  providing said message as input of said second processing block;
  generating, as output of said second processing block, a first output corresponding to a second symmetrical session key, and a second output corresponding to a third key cipher of said second session key with the aid of said second sub-key and of said message;
  providing said second session key as input of said fourth processing block;
  providing said first input parameter as input of said fourth processing block;
  generating a fourth parameter cipher with the aid of said first input parameter and of said second session key;
wherein said cipher comprises said first cipher, said second cipher, said third cipher and said fourth cipher.

The invention also concerns a decryption method when the message to be decrypted is encrypted in accordance with the abovementioned method. Said decryption method therefore comprises steps consisting of:
  finding said first symmetrical session key from said first key and from said decryption key;
  decrypting said second cipher with the aid of said symmetrical session key for said third processing block;
  finding said message.

According to another embodiment of the above-mentioned encryption method, the method comprises steps consisting of:
  defining a fifth processing block implementing said second identity-based key encapsulation mechanism;
  defining a sixth processing block implementing said key encapsulation mechanism;
  defining a seventh processing block;
  providing as input of said fifth processing block, a second input parameter;
  providing as input of said fifth processing block, said message;
  generating, as output of said fifth processing block, a first output corresponding to a third symmetrical session key, and a second output corresponding to a fifth key cipher of said third session key with the aid of said second sub-key and of said message;
  providing said third symmetrical session key to said sixth processing block;
  generating, as output of said sixth processing block, a first output corresponding to a fourth symmetrical session key, and a second output corresponding to a sixth key cipher of said fourth session key with the aid of said first sub-key;
  providing as input of said seventh processing block said fourth session key;
  providing as input of said seventh processing block, said second input parameter;
  providing as input of said seventh processing block, said message;
  generating, as output of said seventh processing block, a seventh cipher corresponding to a cipher of said message and of said second parameter by said fourth session key;
wherein said cipher comprises said fifth cipher, said sixth cipher and said seventh cipher.

In said embodiment, the decryption of the cipher comprises steps consisting of:
  finding said fourth symmetrical session key from said sixth cipher and from said decryption key:
  decrypting said seventh cipher with the aid of said fourth symmetrical session key for said seventh processing block;
  finding said message.

The invention also concerns a computer program comprising a code that can be read by at least one computer, said code producing the execution by said computer of the steps of the abovementioned method.

The invention also concerns a cryptographic system for encrypting/decrypting a message, said cryptographic system comprising:
- a key generation unit suitable for generating encryption keys, said first unit comprising:
  - a first subunit suitable for generating a public key;
  - a second sub-unit suitable for generating a decryption key associated to said public key;
  - a third sub-unit suitable for generating a derivation key associated to said public key;
- an encryption unit suitable for encrypting said message with the aid of said public key into a cipher;
- a decryption unit suitable for decrypting said cipher for finding said message;
- a trapdoor generation unit suitable for generating a trapdoor associated to said message, said trapdoor corresponding to a derivative of said derivation key belonging to said message;
- a suitable test unit, for a test cipher, to determine if said test cipher is an encryption of said message with the aid of said public key.

The invention finally concerns an encryption unit comprising:
- a key generation unit suitable for generating encryption keys, said first unit comprising:
  - a first sub-unit suitable for generating a public key;
  - a second subunit suitable for generating a decryption key associated to said public key;
  - a third sub-unit suitable for generating a derivation key associated to said public key;

wherein, said public key comprises a first sub-key and a second sub-key,
said first sub-key being a public key for encapsulating a first key encapsulation mechanism, said decryption key is the private key associated to first sub-key,
said second sub-key being an identity-based public key of a second identity-based key encapsulation mechanism,
said derivation key being the private key associated to said second sub-key, said encryption unit further comprising,
- a first key encapsulation sub-unit suitable for applying said first key encapsulation mechanism;
- a second identity-based key encapsulation sub-unit suitable for applying said second identity-based key encapsulation mechanism, the identity parameter of said second identity-based key encapsulation mechanism being said message.

The invention will be better understood in light of the following detailed description referring to the appended figures wherein.

Figure 1:
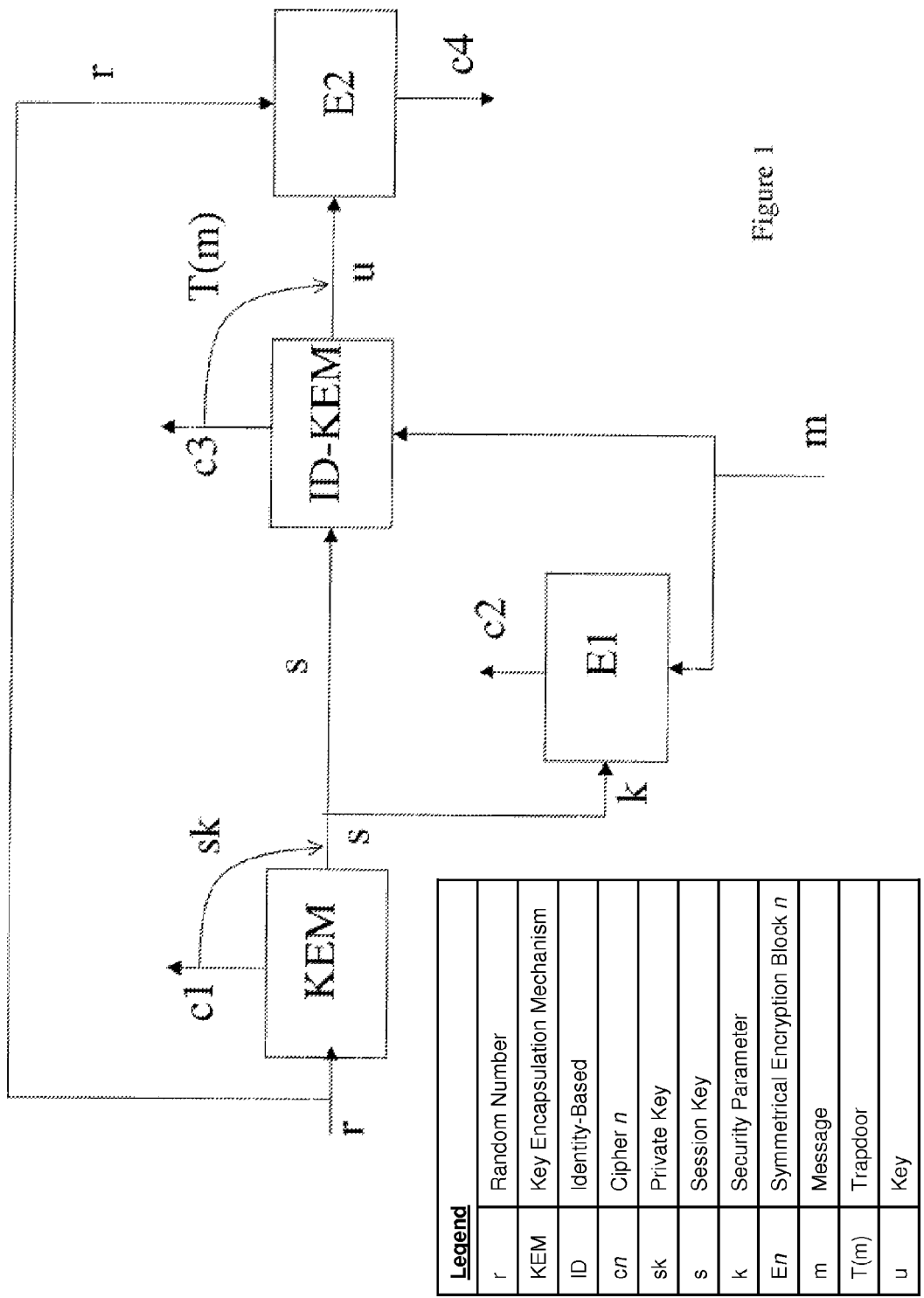
FIG. 1 shows an encryption method according to a first embodiment of the invention.
Figure 2:
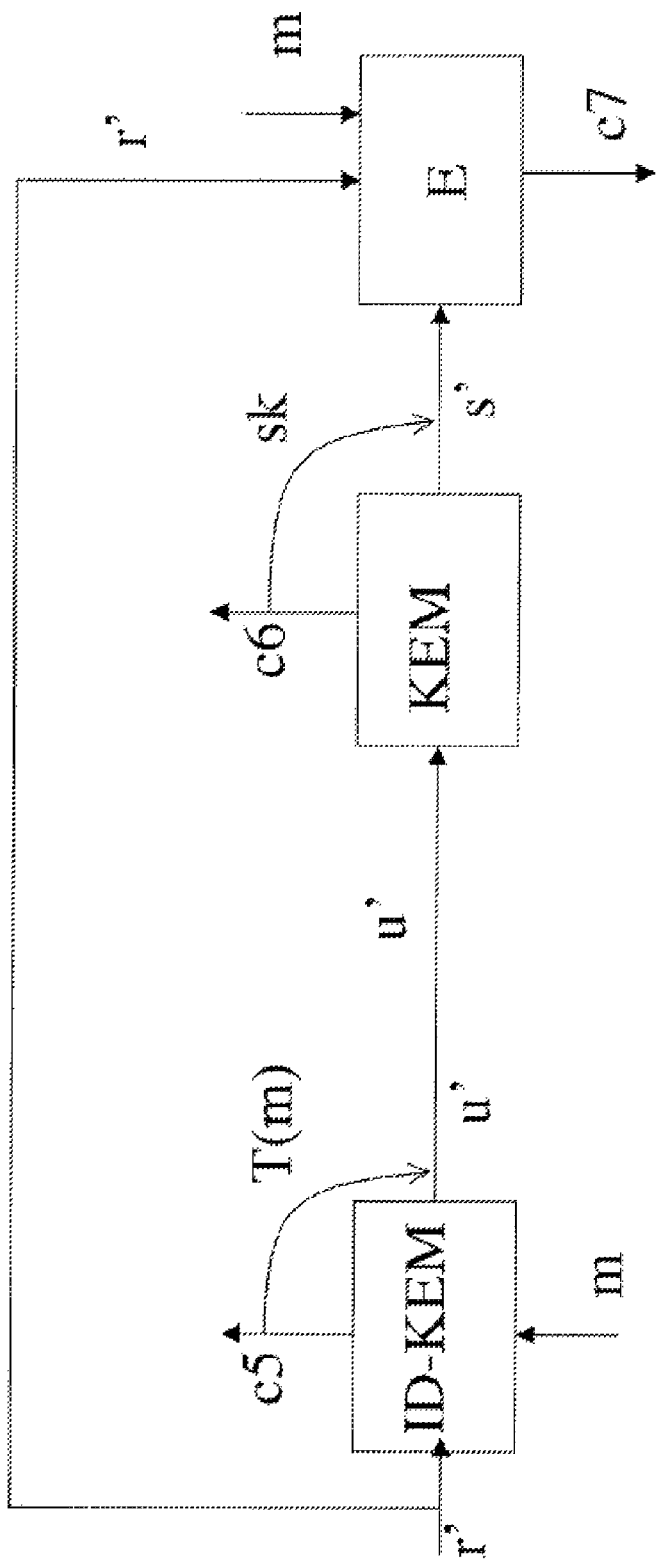
FIG. 2 shows an encryption method according to a second embodiment of the invention.

According to the embodiments illustrated in FIGS. 1 and 2, the invention implements a key encapsulation mechanism KEM and an identity-based key encapsulation mechanism ID-KEM.

Said two types of mechanisms are known as such. We will now describe the main elements of said mechanisms.

A key encapsulation mechanism KEM is a primitive cryptograph relating two entities, in the aim of generating a session key and of exchanging same. It consists of the following mechanisms:

$KeyGen_{KEM}(1^k)$: a key generation mechanism which takes as input a security parameter k and which generates a public key $pk_K$ and a private key $sk_K$;

$Enc_{KEM}(pk_K, r)$: a key encapsulation mechanism which calculates a random key s and encapsulates same in a cipher c by using the public key $pk_K$ and a random number r;

$KD_{KEM}(pk_K, sk_K, c)$: a decapsulation mechanism which takes as input a cipher c, the public key $pk_K$, the private key $sk_K$, and which returns the random key s encapsulated in the cipher c.

The identity-based key encapsulation mechanism ID-KEM itself consists of the following mechanisms:

$KeyGen_{ID-KEM}(1^k)$: a key generation mechanism, which takes as input a security parameter k and generates a public key $pk_I$ and a secret key controller of key derivation $tk_I$;

$KeyDer_{ID-KEM}(tk_I, pk_I, ID)$: a key derivation mechanism which takes as input the public key $pk_I$ the derivation master key $tk_I$ and an identity ID, and which calculates a secret key $sk_{ID}$ associated to the identity, $Enc_{ID-KEM}(pk_I, ID, r)$: a probabilistic key encapsulation mechanism which uses the public key $pk_I$, an identity ID, and a random number r to generate a random key u encapsulated in a cipher c;

$KD_{ID-KEM}(sk_{ID}, c)$: a key decapsulation mechanism which takes as input a cipher c and the secret key associated to the identity $sk_{ID}$ and returns the random key u encapsulated in the cipher under the identity ID.

According to the invention, a decryptable asymmetrical encryption diagram is provided enabling a keyword m search. The diagram according to the invention will be noted after DPEKS for "Decryptable Public-key Encryption with Keyword Search". For this, firstly a key generation mechanism $KeyGen_{DPEKS}(1^k)$ is defined which takes as input a security parameter $1^k$ and generates a public key pk, a decryption key dk, and a trapdoor derivation key tk.

According to the invention, the public key pk is a pair consisting of public keys $pk_K$ and $pk_I$ generated by the key generation mechanism $KeyGen_{KEM}(1^k)$ of the key encapsulation mechanism KEM, and by the key generation mechanism $KeyGen_{ID-KEM}(1^k)$ of the identity-based key encapsulation mechanism ID-KEM.

The decryption key dk corresponds to the private key $sk_K$ generated by the key generation mechanism $KeyGen_{KEM}(1^k)$ of the key encapsulation mechanism KEM.

The trapdoor derivation key tk corresponds to the private key $tk_I$ generated by the key generation mechanism $KeyGen_{ID-KEM}(1^k)$ of the identity-based key encapsulation mechanism ID-KEM.

According to the invention an encryption mechanism $Enc_{DPKES}(pk, m, r)$ is also defined which encrypts a keyword m into a cipher c with the aid of a public key pk and a random number r. Said mechanism is probabilistic.

FIGS. 1 and 2 illustrate two examples of such an encryption mechanism using the keys such as previously generated by the $KeyGen_{DPEKS}$ mechanism.

In the example in FIG. 1, a random number r is provided as input of a processing block KEM such as previously defined. The block KEM generates a session key s, encapsulated in a cipher c1. Said session key s is obtained from c1 by the decapsulation mechanism of the block KEM from the private key $sk_K$. Then said session key s is provided as input of a symmetrical encryption block E1. The message m from which one wishes to produce the decryptable and searchable encryption, is also provided as input of E1. The output of E1 generates a second cipher c2. The session key s as input variable, and the message m as the identity is also provided as input of a processing block ID-KEM. A key u under identity m is thus generated, which is encapsulated in a third cipher c3.

Said key u is then used to encrypt the random number r in a symmetrical encryption block E2.

The cipher resulting from the encryption mechanism $Enc_{DPKES}(pk, m, r)$ is therefore the quadruplet (c1, c2, c3, c4).

Said encryption is for example produced by a first entity, which transmits the cipher obtained to a second entity for decryption and search.

A decryption mechanism $Dec_{DPEKS}(dk, c)$ is now described which decrypts a cipher c with the aid of a decryption key dk.

As above described, according to the invention, the decryption key is the key $sk_K$ generated by the mechanism KEM.

Thus, based on the cipher c=(c1, c2, c3, c4), the cipher c1 and the decryption key $sk_K$ enable the session key s to be found by the decapsulation mechanism of the KEM. Then c2 is decrypted with the session key s for the encryption block E1, which enables the desired message m to be obtained.

The validity of the ciphers c3 and c4 is also verified. For this, the values obtained during the decryption m and s are input, into the ID-KEM encapsulation mechanism for the identity corresponding to the message $Enc_{ID-KEM}(pk_I, m, s)$, in order to verify that the cipher c3 is indeed obtained. Said cipher c3 enables a key u to be obtained with the aid of the ID-KEM decapsulation mechanism and of the private key $sk_m$ derived from the master key $tk_I$ for the message m. The variable r can therefore be decrypted from the block E2 and the key u. The validity of the cipher c is then checked by providing the variable r as input of the KEM and by verifying that c1 and s are indeed obtained.

The trapdoor T(m) provided for the keyword search is defined from the derivation key and the message m by using the key derivation mechanism of ID-KEM, $T(m)=KeyDer_{ID-KEM}(tk_I, pk_I, m)=sk_m$.

The entity responsible for finding the message m can therefore carry out a test to determine if the cipher (c1, c2, c3, c4) provided indeed corresponds to an encryption of the message m with the aid of the public key $pk=(pk_K, pk_I)$.

According to the preceding definition of $c_i$, i=1 to 4, from c3 and T(m), the key u is found by the ID-KEM key decapsulation mechanism, $KD_{ID-KEM}(sk_m, c3)$. The key u therefore enables c4 to be decrypted for the block E2. The input variable r is therefore obtained. With said variable r, $Enc_{KEM}(pk_K, r)$ is launched. A cipher c1*, and a key s* is obtained. With the aid of s*, c2 is decrypted for the block E1, and m* is obtained. $Enc_{ID-KEM}(pk_I, m^*, s^*)$ is therefore launched to obtain a cipher c3*.

The test according to the mechanism of the present invention is therefore $Test_{DPEKS}=\{c1=c1^* \& c3=c3^* \& m=m^*\}$.

Thus, via the mechanism such as previously described, it is possible at the same time to decrypt the cipher received and to test if the cipher received indeed corresponds to a pre-defined keyword resulting from the encryption by a fixed public key.

Examples of key encapsulation mechanisms KEM and identity-based key encapsulation mechanisms ID-KEM are now described that can be used within the context of the present invention.

An example of KEM is the exchange of keys according to the Diffie-Hellman protocol, used in the encryption ElGamal.

In this case, the public parameters of the system are a group G of first order q, a generator g of said group, and an element y. The secret key x is therefore the discreet logarithm of y in base g.

For the encapsulation, a key is generated from a variable r by calculating $s=y^r$, and same is encapsulated in a cipher c with $c=g^r$.

The decapsulation of a key encapsulated in a cipher c is produced by $s=c^x$.

An example of ID-KEM is itself for example provided in the construction of the function PEKS in the publication by Boneh, Di Crescenzo, Ostrovski and Persiano "Public key encryption with keyword search" EUROCRYPT 2004, Volume 3027 in "Lecture notes in Computer science", pages 506-522.

Moreover, it is understood that the diagram described in FIG. 1 can be completed by other hashing or unidirectional functions and/or pseudorandom generators according to the level of security required.

A second embodiment of a decryptable and searchable encryption diagram illustrated in FIG. 2 is now described.

According to said second embodiment, in order to produce a decryptable and searchable encryption, as above, a public key pk is generated consisting of the public keys $pk_K$ and $pk_I$ respectively generated by the key generation mechanism $KeyGen_{KEM}(1^k)$ of a key encapsulation mechanism KEM, and by the key generation mechanism $KeyGen_{ID-KEM}(1^k)$ of an identity-based key encapsulation mechanism ID-KEM.

Said embodiment also involves a symmetrical encryption block E.

The encryption of a message m is produced in the following manner. As input of ID-KEM, a random number r', and the message m is provided. This generates a random number u', which is then encapsulated in a cipher c5. Said key u' is then used as an input variable for the KEM mechanism, so as to generate a key s', which is encapsulated in a cipher c6. Finally, this key s' is provided as input of the symmetrical block E to encrypt the pair (m, r) into a cipher c7.

The cipher c returned is therefore the triplet (c5, c6, c7).

In order to produce the decryption from a cipher (c5, c6, c7), the decryption key $sk_K$ first enables the key s' to be found. Said key s' then enables the cipher c7 to be decrypted for the block E. This makes it possible to find the message m and the random number r'. The validity of the rest of the cipher is then verified by launching the encapsulation mechanism of the ID-KEM $Enc_{ID-KEM}(pk_I, m, r')$ and by verifying that c5 is indeed obtained. The encapsulation mechanism of the ID-KEM also provides a key u', and $Enc_{KEM}(pk_K, u')$ is launched to verify if c6 and s' is indeed obtained.

As in the preceding embodiment, the trapdoor used for the keyword search m is defined from the derivation key $tk_I$ and the message m by using the key derivation mechanism of the ID-KEM $T(m)=KeyDer_{ID-KEM}(tk_I, pk_I, m)=sk_m$.

The entity responsible for finding the message m can therefore carry out a test to determine if the cipher (c5, c6, c7) provided indeed corresponds to an encryption of the message m with the aid of the public key $pk=(pk_K, pk_I)$.

For this, with c5 and the trapdoor T(m), a key u'* is found. Therefore, $Enc_{KEM}(pk_K, u'^*)$ is launched and a key s'* and a cipher c6* is obtained. C7 is therefore decrypted with the key s'* for the block E, which provides a pair (m*, r'*). The encapsulation mechanism of the ID-KEM $Enc_{ID-KEM}(pk_I, m^*, r'^*)$ is then launched and a cipher c5* is obtained. The test used is therefore $$Test_{DPEKS}=\{c5=c5^* \& c6=c6^* \& m=m^*\}.$$

The invention claimed is:

1. A method for encrypting/decrypting a message comprising the following steps:
   generating by a computer keys comprising the following sub-steps:
   generating a public key;
   generating a decryption key associated with said public key;
   generating a derivation key associated with said public key;

for a first entity, encrypting said message with the aid of said public key into a cipher;

for a second entity, decrypting said cipher to find said message;

generating a trapdoor associated with said message, said trapdoor corresponding to a derivative of said derivation key belonging to said message; and for a test cipher, testing, by a computer, with the aid of said trapdoor associated with said message, if said test cipher is an encryption of said message with the aid of said public key.

2. A method for encrypting/decrypting a message comprising the following steps:
generating, by a computer, keys comprising the following sub-steps:
generating a public key;
generating a decryption key associated with said public key;
generating a derivation key associated with said public key;
wherein, said public key comprises a first sub-key and a second sub-key,
said first sub-key being a public encapsulation key of a first key encapsulation mechanism,
wherein said decryption key is the private key associated with said first sub-key,
said second sub-key being an identity-based public key of a second identity-based key encapsulation mechanism,
said derivation key being the private key associated with said second sub-key, and comprising the steps of:
applying said first key encapsulation mechanism; and
applying said second identity-based key encapsulation mechanism, the identity parameter of said second identity-based key encapsulation mechanism being said message.

3. An encryption method according to claim 2, comprising the following steps:
defining a first processing block implementing said key encapsulation mechanism;
defining a second processing block implementing said second identity-based key encapsulation mechanism;
defining a third processing block;
defining a fourth processing block;
providing as input to said first processing block, a first input parameter;
generating, as output of said first processing block, a first output corresponding to a first symmetrical session key, and a second output corresponding to a first key cipher of said first session key with the aid of said first sub-key;
providing said first session key as input to said third processing block;
providing said message as input to said third block;
generating a second message cipher with the aid of said first symmetrical session key and of said message;
providing said first session key as input to said second processing block;
providing said message as input to said second processing block;
generating, as output of said second processing block, a first output corresponding to a second symmetrical session key, a second output corresponding to a third key cipher of said second session key with the aid of said second sub-key and of said message;
providing said second session key as input to said fourth processing block;
providing said first input parameter as input to said fourth processing block; and
generating a fourth parameter cipher with the aid of said first input parameter and of said second session key;
wherein said cipher comprises said first cipher, said second cipher, said third cipher and said fourth cipher.

4. A method for decrypting an encrypted message according to claim 3, comprising the steps of:
finding said first symmetrical session key from said first cipher and from said decryption key;
decrypting said second cipher with the aid of said symmetrical session key for said third processing block; and
finding said message.

5. An encryption method according to claim 2, comprising the steps of:
defining a fifth processing block implementing said second identity-based key encapsulation mechanism;
defining a sixth processing block implementing said key encapsulation mechanism;
defining a seventh processing block;
providing as input to said fifth processing block, a second input parameter;
providing as input to said fifth processing block, said message;
generating, as output of said fifth processing block, a first output corresponding to a third symmetrical session key, and a second output corresponding to a fifth key cipher of said third session key with the aid of said second sub-key and of said message;
providing said third symmetrical session key to said sixth processing block;
generating, as output of said sixth processing block, a first output corresponding to a fourth symmetrical session key, a second output corresponding to a sixth key cipher of said fourth session key with the aid of said first sub-key;
providing as input to said seventh processing block, said fourth session key;
providing as input to said seventh processing block, said second input parameter;
providing as input to said seventh processing block, said message; and
generating, as output of said seventh processing block, a seventh cipher corresponding to a cipher of said message and of said second parameter by said fourth session key;
wherein said cipher comprises said fifth cipher, said sixth cipher and said seventh cipher.

6. A method for decrypting an encrypted message according to claim 5 comprising the steps of:
finding said fourth symmetrical session key from said sixth cipher and from said decryption key;
decrypting said seventh cipher with the aid of said fourth symmetrical session key for said seventh processing block; and
finding said message.

7. A non-transitory computer readable medium containing a code that can be read by at least one computer, said code causing said at least one computer to execute the steps of the method according to claim 1.

8. A cryptographic system for encrypting/decrypting a message, said cryptographic system comprising:
a key generation unit suitable for generating encryption keys, said first unit comprising:
a first sub-unit suitable for generating a public key;
a second sub-unit suitable for generating a decryption key associated with said public key;
a third sub-unit suitable for generating a derivation key associated with said public key;

an encryption unit suitable for encrypting said message with the aid of said public key into a cipher;

a decryption unit suitable for decrypting said cipher for finding said message;

a trapdoor generation unit suitable for generating a trapdoor associated with said message, said trapdoor corresponding to a derivative of said derivation key belonging to said message;

a suitable test unit, for a test cipher, with the aid of said trapdoor associated with said message, to be tested if said test cipher is an encryption of said message with the aid of said public key.

9. An encryption unit comprising a key generation unit suitable for generating encryption keys, said first unit comprising:

a first sub-unit suitable for generating a public key;

a second sub-unit suitable for generating a decryption key associated with said public key;

a third sub-unit suitable for generating a derivation key associated with said public key;

wherein, said public key comprises a first sub-key and a second sub-key, said first sub-key being a public encapsulation key of a first key encapsulation mechanism, wherein said decryption key is the private key associated with said first sub-key, said second sub-key being an identity-based public key, of a second identity-based key encapsulation mechanism, said derivation key being the private key associated with said second sub-key, said encryption unit further comprising, a first key encapsulation sub-unit suitable for applying said first key encapsulation mechanism;

a second identity-based key encapsulation sub-unit suitable for applying said identity-based second key encapsulation mechanism, the identity parameter of said second identity-based key encapsulation mechanism being said message.

10. A non-transitory computer readable medium containing a code that can be read by at least one computer, said code causing at least one computer to execute the steps of the method according to claim 2.

11. A non-transitory computer readable medium containing a code that can be read by at least one computer, said code causing at least one computer to execute the steps of the method according to claim 3.

12. A non-transitory computer readable medium containing a code that can be read by at least one computer, said code causing at least one computer to execute the steps of the method according to claim 4.

13. A non-transitory computer readable medium containing a code that can be read by at least one computer, said code causing at least one computer to execute the steps of the method according to claim 5.

14. A non-transitory computer readable medium containing a code that can be read by at least one computer, said code causing at least one computer to execute the steps of the method according to claim 6.

* * * * *